H. SPENDELOW.
OZONE-GENERATOR.
No. 193,386. Patented July 24, 1877.
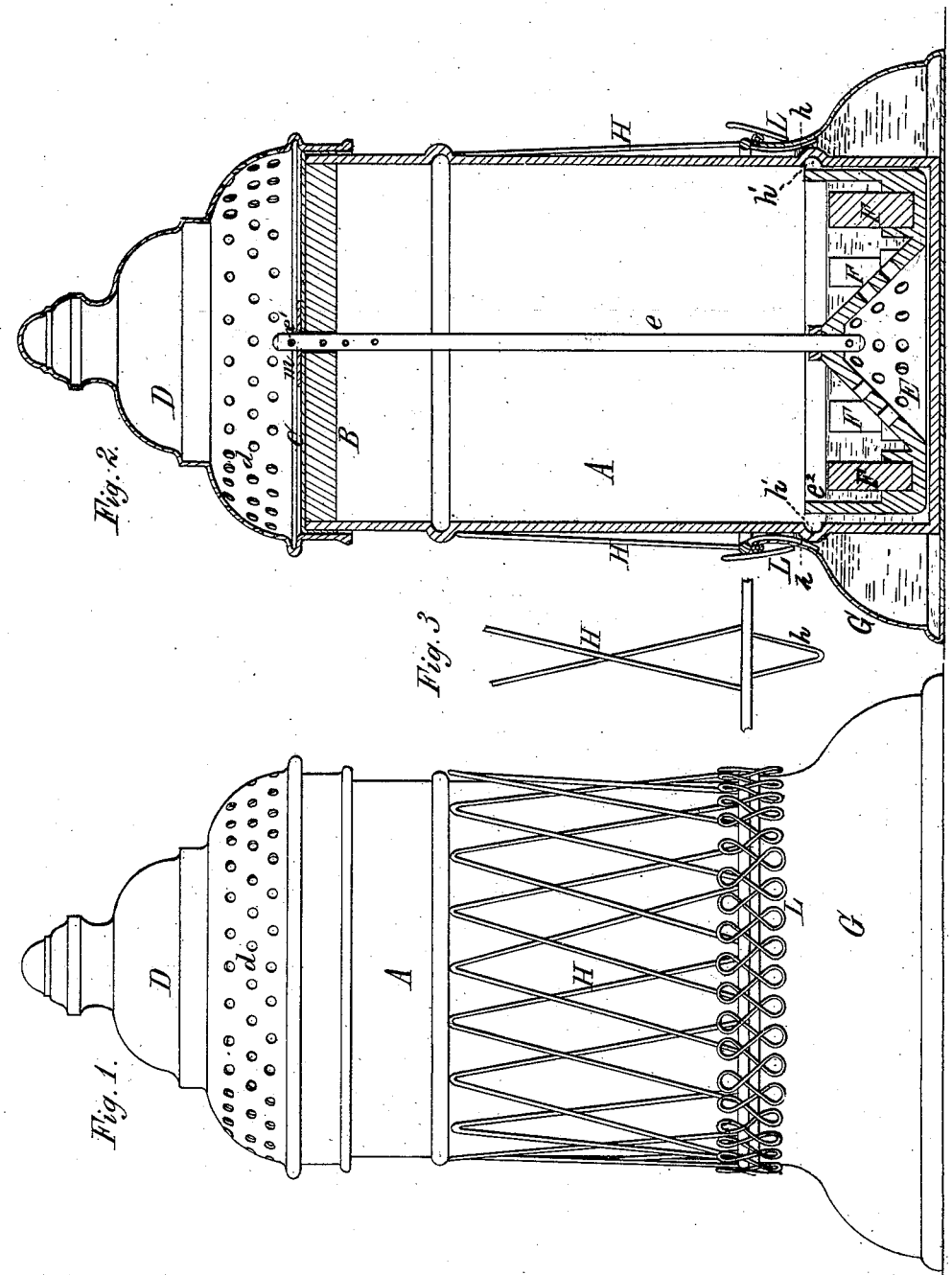

UNITED STATES PATENT OFFICE.

HENRY SPENDELOW, OF BUFFALO, NEW YORK.

IMPROVEMENT IN OZONE-GENERATORS.

Specification forming part of Letters Patent No. 193,386, dated July 24, 1877; application filed January 29, 1877.

*To all whom it may concern:*

Be it known that I, HENRY SPENDELOW, of the city of Buffalo, in the county of Erie, and State of New York, have invented certain Improvements in Ozone-Generators, which improvements are fully set forth in the following specification, reference being had to the accompanying drawing.

My invention relates to an ozone-generator, in which the air enters and the ozone escapes through the porous cover of the vessel, the cover operating as a filter to prevent the escape of the impurities with the ozone, and retain them within the generating-vessel, where they are gradually absorbed by the water on the bottom of the latter.

My invention consists of the particular construction of the machine, and its nature will be fully understood from the following description:

In the accompanying drawing, Figure 1 is a side elevation; and, Fig. 2 a vertical section, of my improved machine. Fig. 3 is a fragmentary view, showing one of the clamps of the wire-screen.

Like letters of reference refer to like parts in each of the figures.

A represents the generating vessel or jar, composed of glass or other suitable material; B represents the cover thereof, made of cork or other porous material; and, C, a chamois-skin stretched over the cover B. D represents a hood, preferably made of spun metal, and provided with perforations $d$.

The hood D is so constructed as to fit over the upper end of the jar A, so that in applying the hood to the latter the chamois-skin C, which is made somewhat larger than the jar, is clamped between the latter and the lower portion of the hood D, and thereby stretched over the cover B and securely held in place.

E represents the phosphorus-holder arranged on the bottom of the jar A. It is made of porcelain or other suitable material, and provided with an upwardly-projecting rod or bar, $e$, penetrating the cover B, and secured to the upper side thereof by a pin, $e^1$, passing through one of a series of holes provided in the bar $e$, so as to be adjustable in the cover. The holder E is provided with a number of small receptacles, in which are placed the sticks of phosphorus, F, and a marginal ring or fender, $e^2$, projecting upwardly, so as to prevent portions of the phosphorus from being thrown against the glass jar A when the phosphorus becomes ignited. The holder E is provided with perforations, which permit the water to pass from the lower to the upper side of the holder, and vice versa. G is a water-pan or receptacle constructed of metal or other suitable material, and arranged so as to surround the lower portion of the generating-jar A; the reservoir G being made of such size that the water-level in the same will be so much above the water-level in the jar A that in case the latter should crack at the water-line, which may occur when the phosphorus becomes ignited or from any other cause, the water contained in the receptacle G will flow into the jar A and submerge the phosphorus, thereby extinguishing the fire.

In warm weather the reservoir G may be filled with ice-water, and in cold weather with warm water, thereby enabling the water in the jar A to be kept at all seasons of the year at a uniform temperature best adapted for the generation of ozone.

H represents a wire screen or netting, arranged around the jar A, above the reservoir G, for protecting and confining the jar A. The screen H is provided at its bottom with several catches, $h$, projecting downwardly, so as to engage under the upper edge of the reservoir G and between it and the rib $h'$ of the jar, thereby connecting the latter with the jar A, so as to enable the machine to be carried about without danger of the water-reservoir becoming detached.

L is an elastic band, preferably made of a continuous piece of wire, and applied to the upper edge of the reservoir G so as to bear partly upon the latter and partly upon the lower portion of the wire-screen H, thereby connecting the parts still more firmly and covering any imperfections or inequalities at the joint.

The generating-vessel A is filled with water sufficiently to completely submerge the phosphorus placed in the holder E when the latter is placed on the bottom of the jar A.

Upon raising the holder E by means of the rod e the phosphorus is exposed to the air, when the generation of ozone commences.

The ozone, together with the phosphoric acid and other impurities, gradually fills the generating-vessel A, the ozone finally escaping through the porous cover B and chamois-skin C into the hood D, while the impurities are retained within the vessel A, where they sink to the bottom, and are absorbed by the water.

The air enters the vessel A, through the skin C and porous cover B, in the same measure as the ozone is discharged.

In order to form a tight joint around the bar e when it passes through the chamois-skin C, a small washer, m, of skin, is preferably placed upon the skin C around the bar e.

Having thus fully described my invention, what I claim as new, and desire to secure by Letters Patent, is—

1. The combination, with the jar A, of the perforated or porous cover B, skin C, and perforated hood D, arranged substantially as and for the purpose hereinbefore set forth.

2. The combination, with the jar A, perforated cover B, and skin C, of the phosphorus-holder E, provided with rod e, secured adjustably to the perforated cover B, substantially as and for the purpose hereinbefore set forth.

3. The combination, with the generating-vessel A, closed at the bottom, of the water-reservoir G surrounding and removably attached to the lower portion thereof, substantially as and for the purpose hereinbefore set forth.

4. The combination, with the jar A, formed with rib $h'$ and water-reservoir G, of the screen H, provided with catches $h$ for connecting the water-reservoir to the jar and protecting the latter, substantially as hereinbefore set forth.

5. The combination, with the jar A and water-reservoir G, of the screen H, provided with catches $h$ and elastic band L, substantially as and for the purpose hereinbefore set forth.

H. SPENDELOW.

Witnesses:
CHAS. J. BUCHHEIT,
GEORGE H. SYKES.